United States Patent [19]

Keiper, Jr. et al.

[11] 4,394,543
[45] Jul. 19, 1983

[54] TELEPHONE LINE HOLDING CIRCUIT

[75] Inventors: Francis P. Keiper, Jr., Sunnyvale; John N. Kerns, Redwood City, both of Calif.

[73] Assignee: Lear Siegler, Inc., Santa Monica, Calif.

[21] Appl. No.: 270,507

[22] Filed: Jun. 4, 1981

[51] Int. Cl.³ .............................................. H04M 1/24
[52] U.S. Cl. ......................... 179/84 R; 179/175.1 R; 179/99 H
[58] Field of Search ................. 179/84 R, 81 R, 99 R, 179/99 H, 175.1 R, 175.2 C; 323/225, 275, 303, 909, 278, 270

[56] References Cited

U.S. PATENT DOCUMENTS

| 3,766,325 | 10/1973 | Hatfield et al. | 179/99 H X |
| 3,840,710 | 10/1974 | Limiero et al. | 179/99 H X |
| 3,857,072 | 12/1974 | James et al. | 179/99 R X |
| 3,895,192 | 7/1975 | Angner et al. | 179/99 H X |
| 4,011,413 | 3/1977 | Phillips | 179/99 H X |
| 4,093,829 | 6/1978 | Silberman | 179/99 H X |

Primary Examiner—G. Z. Rubinson
Assistant Examiner—James L. Dwyer
Attorney, Agent, or Firm—Malcolm J. Romano; Robert J. Schaap

[57] ABSTRACT

A telephone line holding circuit is disclosed which is adapted for temporary connection across a telephone line to maintain that line in a hold condition while line measurements and tests are being performed. The holding circuit is designed to be used over a wide range of line supply voltages and line resistances without introducing line measurement errors. The holding circuit includes a current regulator which maintains the line current at a predetermined level as long as the voltage appearing across the line remains above a predetermined voltage level. The holding circuit also includes a voltage regulator which reduces the predetermined current level to a value which prevents the average line voltage from being reduced below the predetermined voltage level. The holding circuit further includes circuit elements for protecting the circuit elements from damage caused by the application of excessive voltage on the line.

15 Claims, 3 Drawing Figures

TELEPHONE LINE HOLDING CIRCUIT

BACKGROUND OF THE INVENTION

This invention relates to telephone line holding circuits and more particularly to telephone line holding circuits used to maintain a telephone line on hold while measurements and tests are being performed on that line.

A wide variety of telephone line holding circuits have been developed which enable telephone subscribers to hold active calls when their telephone set is placed in an on-hook condition. These circuits typically employ a fixed impedance which is shunted across the telephone line when it is desired to place the line in a hold condition. The fixed impedance establishes the flow of sufficient current through the line, between the telephone set and the central office, to maintain the line in a hold condition. Examples of circuits such as those described above are disclosed in U.S. Pat. No. 3,895,192, issued July 15, 1975, to Ronald J. Angner and Alexander Feiner; U.S. Pat. No. 4,011,413, issued Mar. 8, 1977, to Robert C. Phillips; and U.S. Pat. No. 4,093,829, issued June 6, 1978, to Robert L. Silberman.

The telephone line holding circuits of this invention include holding circuits employed by technicians and service personnel to perform tests and measurements of the telephone line. In testing the telephone line, the holding circuit is connected across the line at the desired point of measurement. A test tone generator is also connected to the line and provides an AC signal used for testing the frequency characteristics at various points along the length of the line.

To ensure accurate line test results, holding circuits for use in a line test application are required to perform functions which are not required of the conventional hold circuit for use with telephone sets as described above. For example, a holding circuit for use in line testing applications must be capable of maintaining the line in a hold condition over a wide range of central office supply voltages and line resistances. Typically, the line supply voltage is provided from a DC power supply or battery located at the central office. The supply voltage is nominally forty-eight volts, but may vary considerably at different installations. The telephone line resistance, usually referred to as the loop resistance, can also vary greatly depending on the distance between the central office and the point of test on the line. Typically, the loop resistance may vary from a minimum of four hundred ohms corresponding to line test points adjacent the central office to as much as several thousand ohms for long lines where the test point is located a significant distance from the central office. The holding circuit must supply sufficient loop current to maintain the line in a hold condition over the range of line supply voltages and loop resistances described above. By way of example, the Bell Telephone System specifications for holding circuits require that the holding circuit be capable of establishing a loop current of twenty-three milliamps under the conditions of a forty-six volt line supply voltage and a seventeen hundred ohm loop resistance.

Another requirement of holding circuits for use in line testing applications is that the holding circuit must not represent an excessive electrical load to the test tone generator, because excessive loading causes frequency and amplitude distortions which result in inaccurate line measurements.

In addition, when the holding circuit is connected to the line, it must not reduce or clamp the instantaneous voltage amplitude of the test tone applied to the line. If the holding circuit clamps the output voltage of the test tone generator, the tone suffers amplitude distortion which results in line measurement errors. By way of example, typical test tones employed for telephone line testing may have an amplitude level of +10 dbm, and a nine hundred ohm impedance. These values represent a peak voltage amplitude of approximately ±4.25 volts across the line at the point at the point of measurement. Accordingly, the holding circuit must not clamp the line to voltages less than this level.

A number of prior art holding circuits have been developed in an effort to meet the requirements stated above. One such circuit employs an inductor which is connected across the line at the measuring point. The inductor is chosen to have sufficiently large inductance so that it represents a high impedance relative to the impedance of the test tone generator at the frequency of measurement. The inductor must also be chosen to have sufficiently low resistance to maintain long lines on hold. However, using such an inductor on lines of relatively short length can result in excessive current flow through the line which may saturate the inductor and cause line measurement errors.

Another type of prior art holding circuit employs an active semiconductor device to shunt the line at the point of measurement in a manner which establishes a constant level of current flow through the line. This type of prior art circuit suffers from several disadvantages. For example, with certain combinations of line resistance and line supply voltage, these types of circuits clamp the line voltage to a value which is below the minimum necessary to perform accurate line measurements. For example, under the conditions of long line length and/or low line supply voltage, it may not be possible to establish a value of line current equivalent to the constant current level of the holding circuit. Under these conditions, prior art holding circuits present a virtual short circuit across the line at the point of measurement. An additional shortcoming of this type of circuit is that the active semiconductor, usually a transistor, can easily be damaged when subjected to high voltage transients which are normally encountered on telephone lines.

It is therefore an object of the present invention to provide a new and improved telephone line holding circuit.

It is another object of the present invention to provide a telephone line holding circuit which can be used in the performance of telephone line measurements and tests without cusing measurement errors.

It is another object of the present invention to provide a telephone line holding circuit for use in the measurement and testing of telephone lines, and which operates over a wide range of line supply voltages and line resistances without introducing measurement errors.

It is still another object of the present invention to provide a telephone line holding circuit which is protected from damage caused by the application of excessive line voltage.

SUMMARY OF THE INVENTION

The foregoing and other objects of the invention are accomplished by a telephone line holding circuit which is designed to be connected across a telephone line to maintain that line in a hold condition while line measurements and tests are being performed. A test tone generator is also connected across the line to provide test tones for performing frequency and distortion measurements of the line. The holding circuit is designed to be used over a wide range of line supply voltages and line resistances without introducing line measurement errors.

The holding circuit of the present invention includes a constant current portion having means for establishing levels of constant current flow through the line of sufficient magnitude to maintain the line in a hold condition. The constant current portion of the circuit employs a shunt element, in the form of a MOSFET transistor, which is connected across the line at the point of measurement to establish a predetermined line current level. The constant current portion of the circuit is also configured to have a sufficiently fast response time to respond to signals from the test tone generator connected to the line. Accordingly, the line holding circuit appears as a high impedance load with respect to the test tone generator, avoiding test tone distortion due to excessive loading. The constant current portion of the holding circuit maintains the line current at a predetermined level as long as the voltage appearing across the line at the point of measurement remains above a predetermined voltage level. This predetermined voltage level is chosen to be higher than the voltage level generated by the test tone generator.

Under certain conditions of low supply voltage and/or high line resistance, maintaining the predetermined current level through the line would result in the average voltage across the line at the point of measurement dropping below the test tone generator voltage. If such a condition arises, the operation of the constant current portion of the holding circuit is augmented by a constant voltage circuit. The constant voltage portion of the circuit is configured to reduce the predetermined current level to a value which maintains the average line voltage above the level of the test tone generator voltage, thereby preventing distortion of the test tone. The constant current circuit always presents a high impedance load with respect to the output voltage of the test tone generator, and thus avoids excessive loading of the generator. The constant voltage portion of the holding circuit permits the use of the telephone line holding circuit on long enough lines having high resistance.

The telephone line holding circuit of the present invention also includes means for protecting the circuit elements from damage caused by the application of excessive voltage on the line. In particular, the MOSFET transistor used as the shunt element in the constant current portion of the holding circuit is protected against excessive power dissipation by limiting to safe loads both the voltage appearing across the MOSFET and the current flowing through the MOSFET.

Other objects, features and advantages of the invention will become apparent by reference to the specification taken in conjunction with the drawings in which like elements are referred to by like reference designations throughout the several views.

DESCRIPTION OF THE PREFERRED EMBODIMENT

Figure 1:
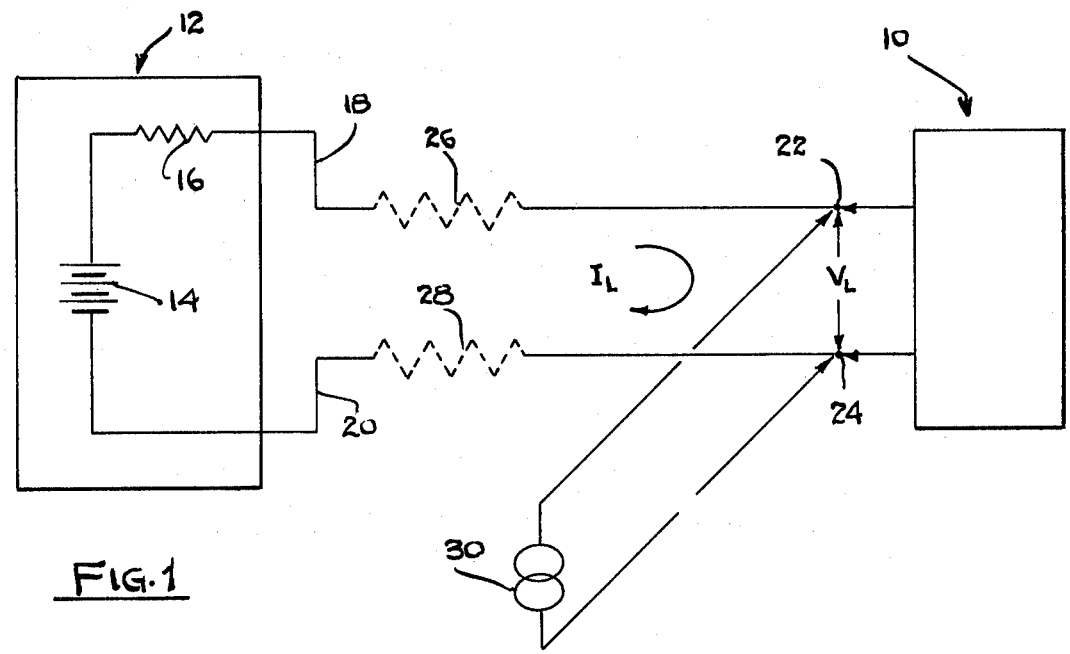
FIG. 1 is a circuit diagram showing the equivalent circuit of a telephone line between a central office and the point of connection of the telephone line holding circuit of the present invention.

Referring to FIG. 1, there is shown a diagram representing the equivalent circuit of a telephone line between a central office 12 and the point of attachment of the telephone line holding circuit 10 of the present invention. The circuitry within the central office 12 of a telephone system includes a DC voltage source 14 shown in the form of a battery in FIG. 1. The voltage source 14 is connected in series with a fixed resistance 16 and this series combination is connected to one end of the telephone line represented by conductors 18 and 20 in FIG. 1. Terminals 22 and 24 represent the desired points of connection of the telephone line holding circuit 10 to the telephone line. In practice, the terminals 22 and 24 may be located anywhere from a few feet to several miles from the central office 12. The equivalent electrical resistance of the conductors 18 and 20 is shown in dotted lines as resistors 26 and 28, respectively, in FIG. 1. In a typical installation, the DC voltage source 14 provides a nominal forty-eight volts and the fixed resistance 16 has a value of four hundred ohms. The combined values of the line resistances 26 and 28 can vary anywhere from a few ohms to several thousand ohms, depending on the length of the telephone line between the central office 12 and the terminals 22 and 24. For purposes of discussion, the series circuit, comprising the voltage source 14 and the resistances 16, 26 and 28, is referred to as a "loop" and the current flowing in this loop is referred to as the "loop current $I_L$." Additionally, the sum of the resistance values of the resistances 16, 26 and 28 is referred to as the "loop resistance $R_L$," and the voltage appearing across the terminals 22 and 24 is referred to as the "line voltage $V_L$."

Performing tests and measurements on the telephone line requires that the line between the central office 12 and the desired terminals of measurement 22 and 24 be maintained in an active hold condition. An active hold condition is established by connecting suitable circuitry across the terminals 22 and 24 which establishes a loop current $I_L$ as shown by the arrow in FIG. 1. The value of the loop current $I_L$ is a function of the magnitude of the voltage source 14, the total loop resistance $R_L$ and the equivalent resistance of the holding circuit connected to the terminals 22 and 24. Typical telephone active holding specifications require that the holding circuit be capable of establishing a twenty-three milliampere loop current $I_L$ when the voltage source 14 is supplying forty-six vols and the total loop resistance $R_L$ is seventeen hundred ohms. Once the line has been placed into an active hold condition, line measurements, such as frequency response, line loss and line distortion may be performed by applying test signals from a test tone generator 30 which is also connected across the terminals 22 and 24 as shown in FIG. 1. The test tone generator 30 is configured to provide nominal signal levels of plus ten dbm through an output impedance of nine hundred ohms, resulting in AC line tests signals having a nominal amplitude of ±five volts. As shown in FIG. 1, the generator 30 is connected in parallel with the holding circuit 10. Accordingly, the holding circuit 10 represents a load for the generator 30 in addition to the load presented by the loop. To minimize measurement error, the holding circuit 10 must be designed to minimize the loading effect on the generator 30. The holding circuit 10 must also be configured so that the line voltage $V_L$ appearing across the terminals 22 and 24 is not clamped by the circuit 10 to a voltage level lower than the output voltage of the generator 30.

Figure 2:
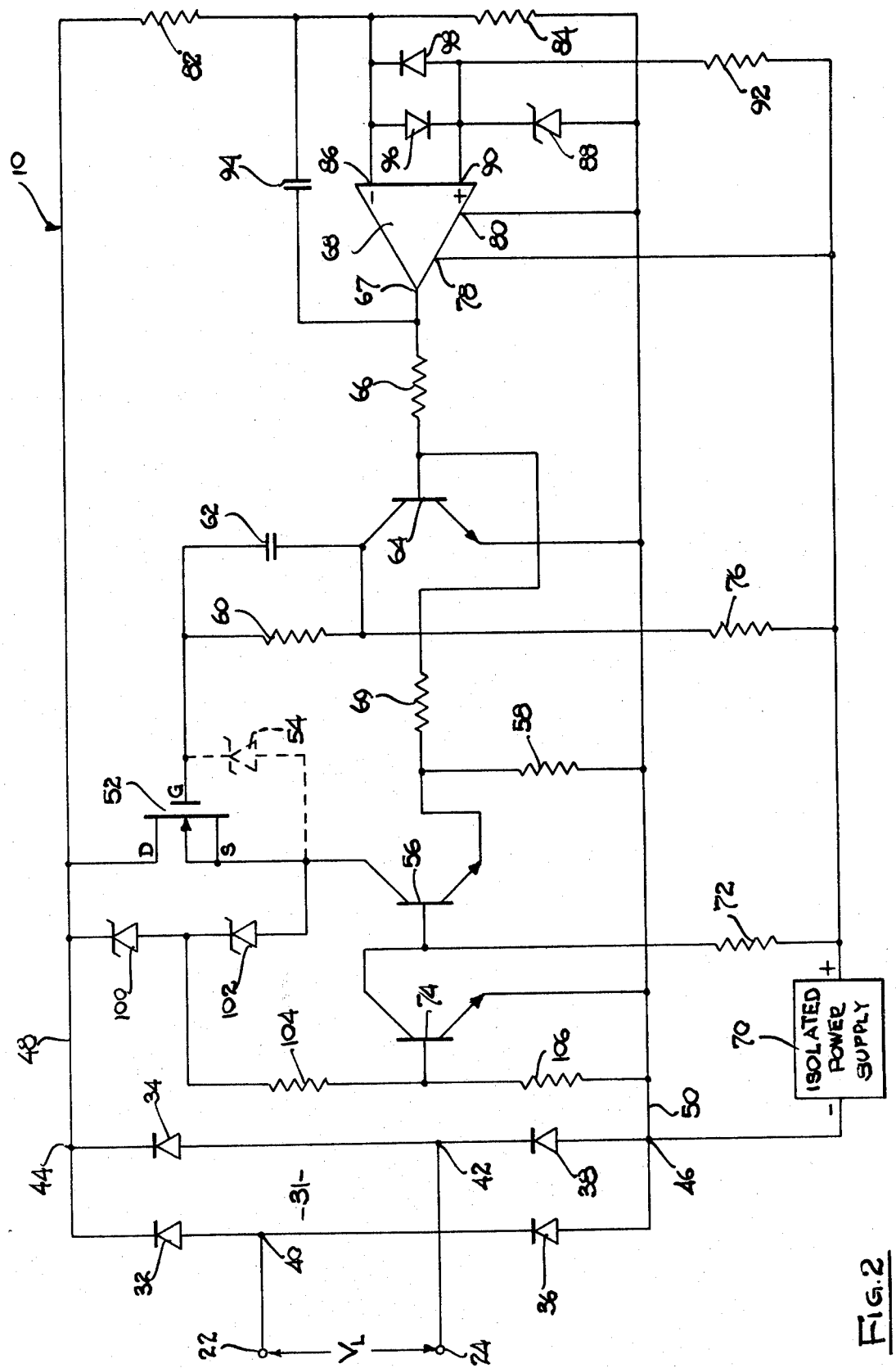
FIG. 2 is a schematic diagram showing the telephone line holding circuit constructed in accordance with the present invention.

Referring now to FIG. 2, there is shown a schematic diagram of the telephone line holding circuit 10 of the present invention. The circuit 10 is connected to the telephone line at the terminals 22 and 24 and includes a full wave bridge circuit 31 comprised of diodes 32, 34, 36 and 38. AC terminals 40 and 42 of the bridge circuit 31 are connected to the telephone line, while the positive and negative terminals 44 and 46 of the bridge circuit 31 are connected respectively to the lines 48 and 50 of the holding circuit 10. The rectifying effect of the full wave bridge circuit 31 assures that voltage of the proper polarity for the operation of the holding circuit is provided on the lines 48 and 50 irrespective of the polarity of the voltage applied to the telephone line from the central office 12. Accordingly, it will be seen that the voltage appearing on the line 48 will always be positive with respect to the voltage on the line 50, independent of the polarity of the voltage appearing at the terminals 22 and 24. It can also be seen that the voltage appearing across the lines 48 and 50 is equivalent to the line voltage $V_L$ less the voltage drop of the bridge 31. The voltage drop of the bridge 31 is, in turn, equivalent to the forward voltage drop of two diodes in series. The result is that the voltage appearing across the lines 48 and 50 is approximately one and a half volts less than the line voltage $V_L$ appearing across the terminals 22 and 24.

As shown in FIG. 2, the drain terminal of and N channel enhancement mode MOS field effect transistor 52 (MOSFET) is connected to the line 48. As described below, the MOSFET or so-called "FET" 52 is employed to regulate the loop current $I_L$. The FET 52 is biased into conduction when the voltage at the gate terminal is made more positive than the voltage at the source terminal. As is well known to those skilled in the art, MOSFETs may be constructed having a zener diode 54 (shown in dotted lines in FIG. 2) connected between the gate and source terminals of the FET 52 to protect the gate to source junction from excessive voltage. The source terminal of the FET 52 is connected to the collector terminal of a high voltage NPN transistor 56. The emitter terminal of the transistor 56 is connected through resistor 58 to the line 50. The gate terminal of the FET 52 is connected through the parallel combination of resistor 60 and capacitor 62 to the collector terminal of NPN transistor 64. The emitter terminal of the transistor 64 is, in turn, connected to the line 50. The emitter terminal of the transistor 56 is connected through resistor 69 to the base terminal of the transistor 64. The base terminal of the transistor 64 is, in turn, connected through resistor 66 to output terminal 67 of operational amplifier 68.

The negative terminal of an isolated DC power supply 70 is connected to the line 50. The power supply 70 is used to supply operating power to the telephone line holding circuit 10. The positive terminal of the power supply 70 is connected through resistor 72 to the base terminal of the transistor 56. The base terminal of the transistor 56 is also connected to the collector terminal of NPN transistor 74. The emitter terminal of the transistor 74 is, in turn, connected to the line 50. The positive terminal of the supply 70 is also connected through resistor 76 to the collector terminal of the transistor 64.

The operation of the circuit discussed thus far may be summarized as follows. The isolated power supply 70 supplies a nominal eight volts DC which establishes base bias current to the base-emitter junction of the transistor 56 through the resistors 72 and 58 to bias the transistor 56 into conduction. As described below, the transistor 74, whose collector terminal is also connected to the base terminal of the transistor 56, remains nonconducting under normal operation of the holding circuit 10. Accordingly, all of the current flowing through the resistor 72 is available to turn on the transistor 56. The voltage from the power supply 70 also provides a positive gate to source voltage for the FET 52 by means of the resistors 76 and 60.

The transistor 64, the collector terminal of which is connected to the junction of the resistors 60 and 76, is controlled in the following manner. Base bias current is supplied to the transistor 64 from two sources. One source is the output voltage from the operational amplifier 68 which provides base bias through the resistor 66. As described below, the output voltage of the amplifier 68 is initially at the level of the line 50, which is also the voltage level of the emitter of the transistor 64. Under these conditions, no base bias current is supplied to the base of the transistor 64 through the resistor 66. Under the conditions described above, the resistor 66 appears in parallel with the base emitter junction of the transistor 64. A second source of base bias for the transistor 64 is provided by the voltage drop appearing across the resistor 58, which supplies base current to the transistor 64 through the resistor 69. The voltage drop appearing across the resistor 58 is, in turn, a function of both the base to emitter and the collector to emitter currents flowing through the transistor 56. The base to emitter current of the transistor 56 is provided from the power supply 70 through the resistor 72. The ratio of the values of the resistors 72 and 58 is chosen such that the base to emitter current through the transistor 56 produces a small voltage drop across the resistor 58. This voltage drop is less than the magnitude of the base emitter voltage necessary to cause the transistor 64 to conduct. It should be noted that the voltage appearing across the base emitter junction of the transistor 64 is the voltage drop across the resistor 58 attenuated by the voltage divider formed by the series resistor 69 and the resistor 66 which appears in parallel with the base emitter junction of the transistor 64 when the output voltage of the amplifier 68 is clamped to the level of the line 50.

When the above-described circuit is connected to the telephone line at the terminals 22 and 24 as shown in FIG. 1, the line voltage $V_L$, less the voltage drop of the bridge 31, appears across the lines 48 and 50. Since both the FET 52 and the transistor 56 have been biased into conduction as described above, loop current $I_L$ flows from the line 48 through the drain to source junction of the FET 52, through the collector emitter junction of the transistor 56 and through the resistor 58 to the line 50. If the loop current $I_L$ flowing through the resistor 58 is of sufficient magnitude to produce a voltage drop across the resistor 58 to forward bias the base emitter junction of the transistor 64, the transistor 64 begins to conduct. Conduction of the transistor 64 provides a current path from the resistor 76 to the line 50, lowering the gate to source bias voltage and reducing the drain to source conduction of the FET 52. The reduced conduction of the FET 52 in turn reduces the loop current $I_L$ and thus the voltage drop across the resistor 58. Reducing the voltage drop across the resistor 58 has the effect of decreasing the conduction of the transistor 64 which, in turn, increases the conduction of the FET 52.

As can be seen from the above discussion, the interconnections of the FET 52, the resistor 58 and the transistor 64 form a closed loop current regulating circuit. The level of current at which the circuit regulates is a function of the value of the resistor 58. The circuit begins regulating current when the voltage drop across the resistor 58 is sufficient to forward bias the base emitter junction of the transistor 64. In the preferred embodiment, the value of the resistor 58 is chosen so that with a loop current of, for example, twenty-seven milliamps, there is sufficient voltage produced across the resistor 58 to forward bias the base emitter junction of the transistor 64 through the voltage divider comprising the resistors 69 and 66.

The speed of response of the closed loop current regulator is increased by means of the capacitor 62 connected in parallel with the resistor 60. The capacitor 62 compensates for the increase in the phase shift of the closed loop caused by the resistor 60 in conjunction with the gate to source capacitance of the FET 52. The use of a FET 52 for the current regulating element, as opposed to a bipolar transistor, has the advantage of reducing the power requirements of the power supply 70 because a FET requires insignificant gate current for its operation.

Referring to FIG. 1, it can be seen that when the holding circuit 10 is connected to the line at the terminals 22 and 24, it will maintain a constant loop current $I_L$. Further, the speed of response of the current regulator portion of the holding circuit 10 is sufficiently fast so that it will maintain constant loop current in response to the line voltage fluctuations caused by the application of a test signal from the test tone generator 30. It is well known to those skilled in the art that the output impedance of a constant current regulator circuit is extremely high. Accordingly, the current regulating circuit, described above, presents a negligible load to the signal from the test tone generator 30.

Figure 3:
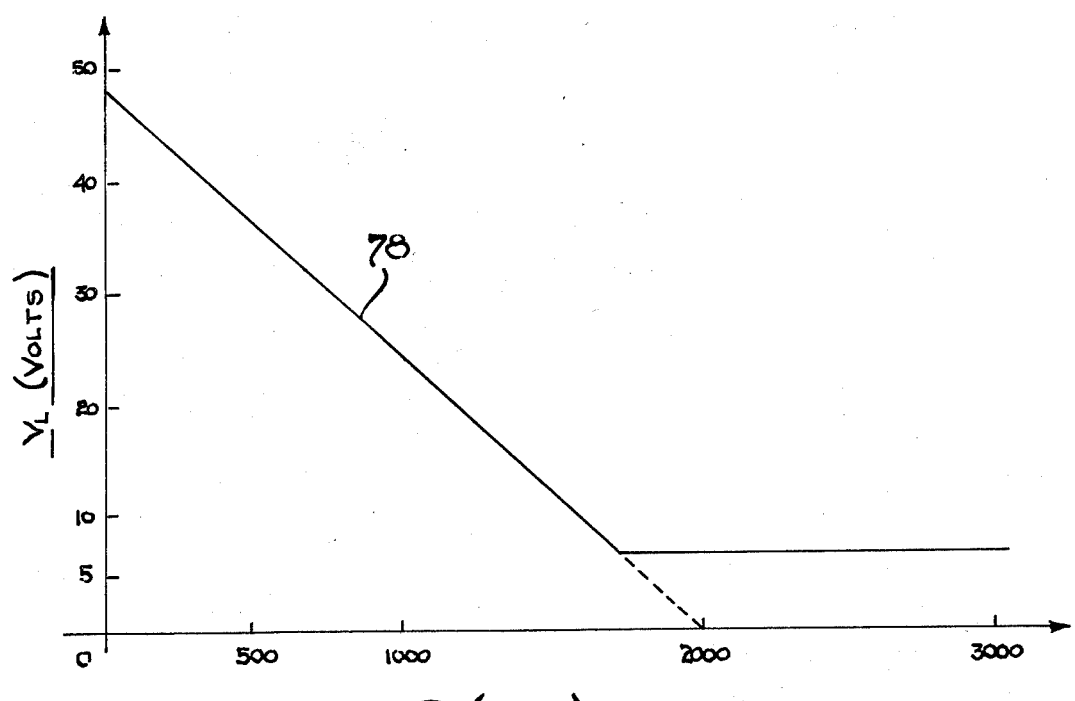
FIG. 3 is a graphic illustration showing the voltage appearing across the telephone line at the point of attachment of the telephone line holding circuit of the present invention, as a function of the total electrical resistance of the telephone line.

FIG. 3 illustrates the effect of operation of the constant current portion of the holding circuit 10 as a function of the loop resistance $R_L$. Curve 78 in FIG. 3 represents the level of the line voltage $V_L$ which appears across the terminals 22 and 24 as a function of the value of the loop resistance $R_L$, when the constant current portion of the circuit 10 is connected to the line. The curve 78 is drawn assuming the voltage source 14 is providing forty-eight volts and that the value of the resistor 58 of FIG. 2 is chosen so that the constant current regulator is set to regulate at twenty-four milliamps. From curve 78 it can be seen that the effect of the constant current regulator is to linearly reduce the level of line voltage $V_L$ as the value of the loop resistance $R_L$ increases. For example, with a loop resistance value of one thousand ohms, the line voltage level is twenty-four volts, and at a loop resistance value of seventeen hundred fifty ohms, the line voltage level is six volts.

For loop resistances greater than seventeen hundred fifty ohms, the curve 78 follows the dotted line shown in FIG. 3, whereby at a loop resistance value of two thousand ohms, the line voltage $V_L$ is zero and remains zero for loop resistance values in excess of two thousand ohms. Line resistance values of two thousand ohms and greater represent the condition where the loop can no longer supply the current level at which the current regulator circuit is set to control, because of excessive line resistance. Returning to FIG. 2, it can be seen that under this condition the voltage drop across the resistor 58 is insufficient to bias the transistor 64 into conduction. Accordingly, the FET 52 is driven into saturation by the gate voltage supplied from the supply 70 through the resistors 76 and 60. In actual practice the saturated FET 52 results in clamping the line voltage $V_L$ to a level a few tenths of a volt above the voltage drop of the bridge 31.

When the line voltage $V_L$ is reduced to a level less than the voltage level of the signal produced by the test tone generator 30, the test signal is attenuated by the loading effect of the current regulator, causing line measurement errors. Accordingly, the current regulator portion of the circuit described above is limited in use to the range of loop resistances $R_L$ which result in line voltages $V_L$ in excess of the amplitude of the test signal from the generator 30.

In practice, it has been found that levels of line voltage $V_L$ as low as six volts still permit accurate line measurements, since the typical amplitude of the test signal is less than five volts. Referring to curve 78 of FIG. 3, it can be seen that with a line source voltage 14 of forty-eight volts, and a constant current level of twenty-four milliamps, the current regulator portion of the circuit is usable up to a loop resistance of seventeen hundred fifty ohms. The condition of either a lower level of source voltage 14 or a higher level of constant current further decreases the maximum range of loop resistance.

The telephone line holding circuit 10 of the present invention includes means for overcoming the above-described limitation of the constant current portion of the circuit as follows. Referring to FIG. 2, the operational amplifier 68 receives operating power from the supply 70 at terminals 78 and 80. Resistors 82 and 84 are connected in series across the lines 48 and 50 and the junction of the resistors 82 and 84 is connected to inverting input terminal 86 of the amplifier 68. Resistor 92 is connected between the positive output terminal of the supply 70 and the cathode terminal of zener diode 88. The anode terminal of the zener 88 is connected to the line 50. The junction between the resistor 92 and the zener 88 is connected to non-inverting input terminal 90 of the amplifier 68. The combination of the resistor 92 and the zener diode 88 provides a reference voltage level at the input terminal 90. A capacitor 94 is connected between the inverting input terminal 86 and the output terminal 67 of the amplifier 68, and diodes 96 and 98 are connected in inverse parallel between the input terminals 86 and 90 of the amplifier 68.

When the voltage level at the inverting input terminal 86 exceeds the voltage level at the non-inverting input terminal 90 of the amplifier 68, the voltage at the output terminal 67 of the amplifier 68 decreases toward the negative supply voltage which is the voltage appearing on the line 50. As described above, the resistor 92, in combination with the zener 88, provides a voltage reference at the non-inverting input 90. In the preferred embodiment, the zener diode 88 is chosen to provide a voltage reference of approximately two and a half volts at the input terminal 90. The voltage divider comprising the resistors 82 and 84 is configured so that approximately one-half the voltage appearing across the lines 48 and 50 appears at the inverting input terminal 86 of the amplifier 68. Accordingly, when the voltage appearing across the lines 48 and 50 is greater than five volts, the voltage appearing at the input terminal 86 will be greater than the reference voltage appearing at the terminal 90. Under this condition the voltage appearing at the output terminal 67 will be approximately the voltage at the line 50.

As described above, the voltage appearing across the lines 48 and 50 is equal to the line voltage $V_L$ less the voltage drop of the bridge 31. Assuming the voltage drop of the bridge 31 is approximately one volt it is apparaent that whenever the line voltage $V_L$ is greater than six volts, the output voltage appearing at the output terminal 67 of the amplifier 68 is approximately the voltage of the line 50. This is the condition assumed in the previous discussion of the constant current regulator portion of the circuit.

If, however, the line voltage $V_L$ decreases below six volts, the voltage appearing at the inverting input terminal 86 is less than the voltage appearing at the non-inverting input terminal 90 of the amplifier 68, and the voltage appearing at the output terminal 67 increases toward the positive voltage level of the power supply 70. As the voltage appearing at the terminal 67 increases, additional base bias is supplied to the transistor 64 through the resistor 66. This additional base bias increases the conduction of the transistor 64, which in turn decreases the conduction of the FET 52. Accordingly, the regulated current level of the current regulator portion of the circuit is reduced, causing a corresponding increase in the line voltage $V_L$. From the operation described above, it can be seen that the amplifier 68 and its associated components form a voltage regulator circuit. This regulator circuit regulates the line voltage $V_L$ to a value which is a function of the value of the zener diode 88 and the relative values of the resistors 82 and 84. In the preferred embodiment, these values have been chosen so that the voltage regulator portion of the circuit maintains the line voltage $V_L$ at a minimum of six volts.

The voltage regulator portion of the circuit can be thought of as augmenting the operation of the current regulator portion of the circuit by adding base bias current to the transistor 64 through the resistor 66. This bias current is in addition to the bias being supplied through the resistor 69 from the voltage drop across the resistor 58. Accordingly, the transistor 64 controls the FET 52 in response to the sum of two signals, one of which is proportional to the loop current $I_L$ and the other of which is proportional to the difference between a reference voltage and the line voltage $V_L$.

The capacitor 94 is connected to the amplifier 68 to form a negative feedback loop and, in conjunction with the resistor 82, determines the response time of the amplifier 68 to rapid changes in the line voltage $V_L$. The diodes 96 and 98 limit the differential voltage appearing across the input terminals 86 and 90 to prevent damage to the amplifier 68. The diodes 96 and 98 also limit the voltage level to which the capacitor 94 can charge. Limiting the voltage charge on the capacitor 94 ensures that the voltage regulator portion of the circuit will operate without undue delay whenever the line voltage $V_L$ abruptly changes in level.

It is important to note that the constant voltage portion of the circuit described above does not replace the operation of the constant current portion of the circuit. In fact, the two portions of the circuit are both active whenever the line voltage $V_L$ decreases to six volts.

Referring to FIG. 3, the operation of the constant voltage portion of the circuit 10 is shown by the horizontal portion of the curve 78. It can be seen that when the loop resistance $R_L$ is sufficiently large so that the line voltage $V_L$ has decreased to six volts, the voltage regulator portion of the circuit 10 decreases the loop current $I_L$ to maintain the voltage $V_L$ at six volts. This six-volt level is maintained for loop resistances $R_L$ in excess of two thousand ohms and the circuit 10 will continue in operation as long as the loop will supply sufficient loop current $I_L$ to maintain the line on hold.

Referring to FIG. 1, it can be seen that by maintaining the average line voltage $V_L$ at a minimum of six volts, the output signal from the test tone generator 30 will not be attenuated or distorted. The response time of the constant voltage portion of the circuit is chosen by means of the capacitor 94 and the resistor 82 so that the amplifier 68 does not respond to the line voltage variations caused by the test signal from the generator 30. Thus, the constant voltage portion of the circuit 10 maintains the average DC level of the line at six volts, while the constant current portion of the circuit provides the high impedance necessary to permit the line voltage to follow the fluctuations which represent the test signal from the generator 30.

Telephone lines are frequently subjected to the application of excessively high voltages which may be caused by line transients, surges, or improper switching conditions. The telephone line holding circuit 10 of the present inention provides means for protecting the circuit components from damage due to the application of excessive line voltage. Referring to FIG. 2, zener diodes 100 and 102 are connected in series across the drain to source junction of the FET 52. The junction between the zener diodes 100 and 102 is connected through resistor 104 to the base terminal of the transistor 74 and a resistor 106 is connected between the base and the emitter terminals of the transistor 74.

The value of the zener diode 100 is chosen to be above the maximum continuous voltage level expected from the line voltage source 14 under normal conditions, but below the drain to source breakdown voltage of the FET 52. In the preferred embodiment, the diode 100 is chosen to have a fifty-six volt zener voltage and the FET 52 is chosen to have an eighty-volt drain to source breakdown voltage. If the voltage across the lines 48 and 50 exceeds fifty-six volts due to abnormal line conditions, the zener diode 100 conducts and provides base bias current to the transistor 74 through the resistor 104. The resistor 104 and 106 form a voltage divider so that the voltage across the lines 48 and 50 must be slightly in excess of the zener voltage of the diode 100 before the transistor 74 is biased into conduction. When this condition occurs, the transistor 74 conducts and shunts to the line 50 the bias current being supplied to the transistor 56 through the resistor 72. This has the effect of turning off the transistor 56 which is in series with the FET 52. When the transistor 56 turns off, drain to source current flow through the FET 52 ceases. Accordingly, the FET 52 is protected from excessive current flow when excessive line voltage is present. Should the line voltage rise even higher than the zener voltage of the diode 100, the diode 102 is biased into conduction. In the preferred embodiment, the diode 102 is chosen to have a zener voltage of seven volts. Accordingly, the series combination of the diodes 100 and 102 limits the voltage appearing across the drain to source junction of the FET 52 to less than sixty-five volts, which is safely below the breakdown voltage of the FET 52.

As shown in FIG. 2, when the transistor 56 is not conducting, the current flow through the zeners 100 and 102 also passes through the source to gate protection diode 54, which is incorporated in the design of the FET 52, and also flows through the resistor 60 and the collector emitter junction of the transistor 64. The value of the resistor 60 is chosen to safely limit this current flow to values within the ratings of the protection diode 54 and the transistor 64. The collector to emitter breakdown voltage of the transistor 56 is chosen to be higher than any expected line voltage surges. In the preferred embodiment, the collector to emitter breakdown voltage of the transistor 56 is chosen as three hundred volts. The circuitry described above completely protects the FET 52 from damage due to the application of excessive voltage by both limiting the voltage appearing across the FET 52 and by limiting the current passing through the FET 52. In the preferred embodiment, this has the effect of limiting the power dissipation of the FET 52 to less than two watts under over-voltage conditions.

In a preferred embodiment of the invention, components of the following values may be used:

| Reference Designation | Value |
| --- | --- |
| 32, 34, 36, 38 | VM-68 bridge, Varo Semiconductor |
| 52 | VN-89AF, Siliconix, Inc. |
| 56 | 2N6516 |
| 58 | 24 ohms |
| 60 | 750 kilohms |
| 62 | .005 microfarad |
| 64, 74 | 2N3904 |
| 66 | 5 kilohms |
| 68 | CA3130, RCA Semiconductor |
| 69 | 1 kilohm |
| 72 | 2 kilohms |
| 76 | 10 kilohms |
| 82 | 1 megohm |
| 84 | .909 megohm |
| 88 | LM336, National Semiconductor |
| 92 | 5 kilohms |
| 94 | .47 microfarad |
| 96, 98 | 1N4148 |
| 100 | 56 volt zener |
| 102 | 100 kilohms |
| 106 | 51 kilohms |

While the invention is disclosed and a particular embodiment is described in detail, it is not intended that the invention be limited solely to this embodiment. For example, while the holding circuit of the present invention is described for use in telephone line testing applications, it may also be used in line holding applications which enable telephone subscribers to hold active calls when their telephone set is placed in an on-hook condition. Many other modifications will occur to those skilled in the art which are within the spirit and scope of the invention. It is thus intended that the invention be limited in scope only by the appended claims.

What is claimed is:

1. A holding circuit adapted for connection across a telephone line which has a voltage across the line and a current flowing through the line when held, said holding circuit being adapted to maintain the line on hold, said holding circuit comprising:

(a) current regulating means responsive to a current flow through a telephone line having a voltage across the line and a current flowing through the line for maintaining the line current at a predetermined current level when the voltage across the line is at least at a predetermined minimum voltage level;

and (b) voltage regulating means reponsive to the voltage appearing across the line for preventing an average of the line voltage from being reduced below said predetermined minimum voltage level, said voltage regulating means controlling said current regulating means in response to current flow through the telephone line and the difference between voltage across the telephone line and a reference voltage.

2. The holding circuit of claim 1 in which the voltage regulating means includes means for reducing the line current below the predetermined current level.

3. The holding circuit of claim 1 in which the predetermined minimum voltage level is chosen to be greater than the peak amplitude of an AC test signal applied to the line for line test purposes.

4. The holding circuit of claim 3 in which the voltage regulating means includes means for rendering the voltage regulating means non-responsive to line voltage variations caused by the AC test signal.

5. The holding circuit of claim 1 in which the current regulating means includes:

a first transistor;
    means for connecting the first transistor across the telephone line;
    means for sensing the line current; and
    first control means for controlling the conduction of the first transistor in response to the means for sensing the line current, whereby the conduction of the first transistor is varied to maintain the line current at the predetermined current level.

6. The holding circuit of claim 5 in which the voltage regulating means further includes:

(a) means for sensing the line voltage and comparing it to said reference voltage; and
    (b) second control means for controlling the conduction of the first transistor in response to the means for sensing the line voltage, whereby the conduction of the first transistor is reduced to prevent the line voltage from being reduced below the predetermined minimum voltage level.

7. The holding circuit of claim 5 further including current limiting means for blocking the flow of line current through the first transistor whenever the line voltage exceeds a first predetermined maximum voltage level.

8. The holding circuit of claim 5 further including voltage limiting means for limiting the voltage level across the first transistor whenever the line voltage exceeds a second predetermined maximum voltage level.

9. The holding circuit of claim 5 in which the first transistor is a field effect transistor having drain, source and gate terminals; the means for connecting the first transistor across the line comprises means for connecting the drain terminal to one side of the line, and means for connecting the source terminal through a first resistance to the other side of the line; and the means for sensing the line current includes the voltage drop appearing across the first resistance.

10. The holding circuit of claim 9 in which the first control means includes:
means for providing a gate bias voltage to the gate terminal of the field effect transistor to bias it into conduction;
a second transistor having base, emitter, and collector terminals;
means for connecting the second transistor to the gate terminal of the field effect transistor so that conduction of the second transistor reduces the gate bias voltage and conduction of the field effect transistor;
first bias means responsive to the voltage drop across the first resistance; and
means for connecting the first bias means across the base and emitter terminals of the second transistor to bias it into conduction whenever the first bias means exceeds the base-emitter junction voltage of the second transistor.

11. The holding circuit of claim 10 in which the voltage regulating means includes:
means for sensing a portion of the line voltage and means for comparing it to a reference voltage;
second bias means responsive to the difference between the reference voltage and the sensed portion of the line voltage; and
means for connecting the second bias means across the base and emitter terminals of the second transistor to bias it into conduction whenever the sensed portion of the line voltage is less than the referenced voltage.

12. The holding circuit of claim 9 further including:
a third transistor;
means for connecting the third transistor in series with the first transistor;
means for biasing the third transistor into conduction; and
means for removing the bias from the third transistor whenever the line voltage exceeds a first predetermined maximum voltage level.

13. The holding circuit of claim 12 in which the means for removing the bias from the third transistor includes:
a fourth transistor;
means for connecting the fourth transistor to the third transistor so that when the fourth transistor is biased into conduction it shunts the bias to the third transistor;
first and second zener diodes;
means for connecting the first and second zener diodes in series across the drain and source terminals, respectively, of the field effect transistor; and
means for connecting the junction between the first and second zener diodes to the base terminal of the fourth transistor.

14. The holding circuit of claim 11 in which the second bias means includes:
an operational amplifier having inverting and non-inverting input terminals and an output terminal;
means for connecting the reference voltage to the non-inverting input terminal of the amplifier;
means for connecting the means for sensing a portion of the line voltage to the inverting input terminal of the amplifier; and
means for connecting the output terminal of the amplifier to the base terminal of the second transistor so that output signals from the amplifier appear across the base and emitter terminals of the second transistor.

15. The holding circuit of claim 14 further including a capacitor, and means for connecting the capacitor between the inverting input terminal and the output terminal of the amplifier to render the amplifier non-responsive to line voltage variations caused by the application of an AC test signal to the line.

* * * * *